(12) United States Patent
Gonsalves et al.

(10) Patent No.: US 8,589,242 B2
(45) Date of Patent: Nov. 19, 2013

(54) RETAIL INTERFACE

(75) Inventors: Michael F. Gonsalves, Minneapolis, MN (US); Gregory M. Nations, Minneapolis, MN (US); Chad R. Gourley, Elk River, MN (US); Patricia Korth-McDonnell, Brooklyn, NY (US); Sarah E. Schoeffler, Minneapolis, MN (US); Joe Stewart, Brooklyn, NY (US)

(73) Assignee: Target Brands, Inc., Minneapolis, MN (US)

( * ) Notice: Subject to any disclaimer, the term of this patent is extended or adjusted under 35 U.S.C. 154(b) by 39 days.

(21) Appl. No.: 12/973,651

(22) Filed: Dec. 20, 2010

(65) Prior Publication Data

US 2012/0158551 A1 Jun. 21, 2012

(51) Int. Cl.
*G06Q 30/00* (2012.01)
(52) U.S. Cl.
USPC ........................................ 705/26.1; 705/27.1
(58) Field of Classification Search
USPC ............................................. 705/26.1, 27.1
See application file for complete search history.

(56) References Cited

U.S. PATENT DOCUMENTS

| | | | |
|---|---|---|---|
| D109,791 S | 5/1938 | Sonin | |
| 5,423,139 A | 6/1995 | Feldman | |
| 5,644,735 A | 7/1997 | Luciw et al. | |
| 5,956,709 A | 9/1999 | Xue | |
| D415,483 S | 10/1999 | Decker | |
| 6,014,634 A | 1/2000 | Scroggie et al. | |
| 6,026,376 A | 2/2000 | Kenney | |
| 6,032,130 A | 2/2000 | Alloul et al. | |
| 6,055,573 A | 4/2000 | Gardenswartz et al. | |
| 6,141,666 A | 10/2000 | Tobin | |
| 6,182,871 B1 | 2/2001 | Lam | |
| 6,216,139 B1 | 4/2001 | Listou | |

(Continued)

FOREIGN PATENT DOCUMENTS

| | | |
|---|---|---|
| CA | 2714783 A1 | 6/2011 |
| EP | 2015245 | 1/2009 |

(Continued)

OTHER PUBLICATIONS

Trend Shop Unveiled by shop.com: Shoppers Can 'Get the Look': Premier products and brands featured in unique editor collections and ensembles, Anonymous. PR Newswire [New York] Oct. 25, 2010. Downloaded from ProQuestDirect on the Internet on Sep. 18, 2013, 2 pages.*

(Continued)

*Primary Examiner* — James Zurita
(74) *Attorney, Agent, or Firm* — Nixon & Vanderhye P.C.

(57) ABSTRACT

In one example a retail webpage displays a product collage and social media content. For example, the social media content includes reviews by a user's social contacts and/or an image of the user, a social contact, and/or a product. Some content of the website, for example, is organized to display content in a predefined layout. In another example, a retail website system collects social information from external social networks. For example, a user's social information is identified and content created by the user's social contacts is identified. The social contact-created content is displayed, for example, with a product or group of products. In another example, the layout of a webpage is organized to encourage a user to explore the webpage. The layout, for example, includes elements in two columns with content adjacent to similar content. For example, elements in descending location relate more or less specifically to a user.

20 Claims, 4 Drawing Sheets

(56) References Cited

U.S. PATENT DOCUMENTS

| | | | |
|---|---|---|---|
| 6,298,330 B1 | 10/2001 | Gardenswartz et al. | |
| 6,542,927 B2 | 4/2003 | Rhoads | |
| 6,604,681 B1 | 8/2003 | Burke et al. | |
| 6,766,212 B1 | 7/2004 | Dean | |
| 6,965,376 B2 | 11/2005 | Tani et al. | |
| 7,002,573 B2 | 2/2006 | Trotta et al. | |
| 7,010,876 B1 | 3/2006 | Siegel et al. | |
| 7,055,130 B2 | 5/2006 | Charisius et al. | |
| 7,062,453 B1 | 6/2006 | Clarke | |
| 7,263,499 B2 | 8/2007 | Kunigita | |
| 7,284,206 B2 | 10/2007 | Ozawa et al. | |
| 7,409,362 B2 | 8/2008 | Calabria | |
| 7,503,502 B2 | 3/2009 | Montague | |
| D590,412 S | 4/2009 | Saft et al. | |
| 7,529,797 B2 | 5/2009 | Tseng et al. | |
| D599,373 S | 9/2009 | Kobayashi et al. | |
| 7,603,292 B1 | 10/2009 | Bragg et al. | |
| 7,613,687 B2 | 11/2009 | Nye | |
| 7,676,387 B2 | 3/2010 | Childress et al. | |
| 7,702,542 B2 | 4/2010 | Aslanian, Jr. | |
| D619,613 S | 7/2010 | Dunn | |
| D622,280 S | 8/2010 | Tarara | |
| D625,323 S | 10/2010 | Matsushima et al. | |
| D626,133 S | 10/2010 | Murphy et al. | |
| 7,890,378 B2 | 2/2011 | Clarke et al. | |
| 7,996,282 B1 | 8/2011 | Scott et al. | |
| 8,001,003 B1 | 8/2011 | Robinson et al. | |
| D644,663 S | 9/2011 | Gardner et al. | |
| D656,950 S | 4/2012 | Shallcross et al. | |
| 8,244,590 B2 | 8/2012 | Rothman | |
| 8,250,145 B2 | 8/2012 | Zuckerberg et al. | |
| 2001/0029465 A1 | 10/2001 | Strisower | |
| 2002/0046105 A1 | 4/2002 | Gardenswartz et al. | |
| 2002/0165799 A1 | 11/2002 | Jaffe et al. | |
| 2003/0014501 A1 | 1/2003 | Golding et al. | |
| 2003/0050848 A1 | 3/2003 | Defayette et al. | |
| 2005/0040230 A1 | 2/2005 | Swartz et al. | |
| 2005/0055321 A1 | 3/2005 | Fratkina et al. | |
| 2005/0081251 A1 | 4/2005 | Walker et al. | |
| 2005/0144093 A1 | 6/2005 | Kassan | |
| 2005/0147054 A1 | 7/2005 | Loo et al. | |
| 2005/0149269 A1 | 7/2005 | Thomas et al. | |
| 2006/0053066 A1 | 3/2006 | Sherr et al. | |
| 2006/0103130 A1 | 5/2006 | Koivukunnas et al. | |
| 2006/0277103 A1 | 12/2006 | Fujita et al. | |
| 2006/0277477 A1 | 12/2006 | Christenson | |
| 2007/0022020 A1 | 1/2007 | Bernstein | |
| 2007/0078850 A1 | 4/2007 | Aziz et al. | |
| 2007/0095615 A1 | 5/2007 | Spector | |
| 2007/0162850 A1 | 7/2007 | Alder et al. | |
| 2007/0192168 A1 | 8/2007 | Van Luchene | |
| 2007/0226189 A1 | 9/2007 | Piekos et al. | |
| 2007/0244883 A1 | 10/2007 | Bessieres et al. | |
| 2007/0244900 A1 | 10/2007 | Hopkins et al. | |
| 2007/0300261 A1 | 12/2007 | Barton et al. | |
| 2008/0005125 A1 | 1/2008 | Gaedeke | |
| 2008/0077487 A1 | 3/2008 | Davis et al. | |
| 2008/0097844 A1 | 4/2008 | Hsu et al. | |
| 2008/0133500 A1 | 6/2008 | Edwards et al. | |
| 2008/0147640 A1 | 6/2008 | Schachter | |
| 2008/0235085 A1 | 9/2008 | Kovinsky et al. | |
| 2008/0255962 A1 | 10/2008 | Chang et al. | |
| 2008/0270248 A1 | 10/2008 | Brill | |
| 2008/0270250 A1 | 10/2008 | Bolivar et al. | |
| 2009/0037355 A1 | 2/2009 | Brave et al. | |
| 2009/0106085 A1 | 4/2009 | Raimbeault | |
| 2009/0106113 A1 | 4/2009 | Arora et al. | |
| 2009/0132388 A1 | 5/2009 | Omori et al. | |
| 2009/0164315 A1 | 6/2009 | Rothman | |
| 2009/0164323 A1 | 6/2009 | Byrne | |
| 2009/0171812 A1 | 7/2009 | Fadell | |
| 2009/0173792 A1 | 7/2009 | Montague | |
| 2009/0199115 A1 | 8/2009 | Singh | |
| 2009/0265968 A1 | 10/2009 | McNamee | |
| 2009/0273612 A1 | 11/2009 | Xie | |
| 2009/0292599 A1 | 11/2009 | Rampell et al. | |
| 2009/0299965 A1 | 12/2009 | Aziz et al. | |
| 2009/0307100 A1 | 12/2009 | Nguyen et al. | |
| 2010/0114720 A1 | 5/2010 | Jones et al. | |
| 2010/0179876 A1 | 7/2010 | Holte | |
| 2010/0186066 A1* | 7/2010 | Pollard | 726/3 |
| 2010/0198697 A1 | 8/2010 | Brown et al. | |
| 2010/0223082 A1 | 9/2010 | Becker et al. | |
| 2010/0250336 A1 | 9/2010 | Selinger et al. | |
| 2011/0029368 A1 | 2/2011 | Hsu et al. | |
| 2011/0125569 A1 | 5/2011 | Yoshimura et al. | |
| 2011/0153451 A1 | 6/2011 | Bitz et al. | |
| 2011/0173095 A1 | 7/2011 | Kassaei et al. | |
| 2011/0225152 A1* | 9/2011 | Beaudreau et al. | 707/728 |
| 2011/0302498 A1 | 12/2011 | Gorodyansky | |
| 2012/0151383 A1* | 6/2012 | Kazan et al. | 715/753 |
| 2012/0166945 A1 | 6/2012 | Roberts et al. | |

FOREIGN PATENT DOCUMENTS

| | | |
|---|---|---|
| WO | WO 00/79446 | 12/2000 |
| WO | WO 01/45020 | 6/2001 |
| WO | WO0184447 | 11/2001 |
| WO | WO 02/03268 | 1/2002 |
| WO | WO 2005/066844 | 7/2005 |
| WO | WO 2006/101348 | 9/2006 |
| WO | WO 2007/005431 | 1/2007 |

OTHER PUBLICATIONS

Huge, Target Patents, Target Patent Annotations, PowerPoint Slides, Mar. 28, 2011, 35 pages.

Maldonado, Robert T., Letter to Gardella, Greg H., Re: Inventor Declarations from HUGE Inventors, Mar. 31, 2011, 2 pages.

Gardella, Greg H., Letter to Robert T. Maldonado, Re: HUGE Inventors for Target Brands, Inc. Patent Applications, Apr. 11, 2011, 5 pages.

Facebook Developers Facebook Connect, Build and grow with Facebook Connect, [Online] Dec. 18, 2009, Retrieved from the Internet at: http://developers.facebook.com/connect.php, 2 pages.

Amazon.com, [Online], Dec. 20, 2010, Retrieved from the Internet at: http://www.amazon.com/gp/wedding/homepage/ref=sv_cm_gft_5, 1 page.

BabiesRus, Baby Gifts—Baby Registry at BabiesRus, [Online], Dec. 20, 2010, Retrieved from the Internet at: http://www.toysrus.com/registry/index.jsp, 1 page.

Office Action from U.S. Appl. No. 12/887,098 dated Mar. 18, 2013.

Office Action from U.S. Appl. No. 12/973,651 dated Jan. 28, 2013.

Crate&Barrel, [Online], Dec. 20, 2010, Retrieved from the Internet at: http://www.crateandbarrel.com/gift-registry/, 1 page.

Huddleston, Rob, HTML, XHTML, and CSS: Your Visual Blueprint for Designing Effective Web Pages, Jun. 3, 2008, Wiley Publishing, Inc., pp. 15, 34, 53, 138, 158, 164-65, 173-74, 195, 200, 218, 250-51, 306, 355.

Macy"s, [Online], Dec. 20, 2010, Retrieved from the Internet at: http://macys.com/registry/wedding/registryhome, 1 page.

Scott, Bill and Neil, Theresa, Designing Web Interfaces, Jan. 19,2009, O'Reilly Media, Inc., pp. 147-48, 237.

Office Action from Canadian Patent Application No. 2,761,558, mailed Apr. 18, 2013 (3 pages).

Cohen, Jun., "The Unusually Useful Web Book," New Riders Publishing, Jun. 2003, pp. 113-114.

Cummings, E.E., Poem entitled "i carry your heart with me (I carry it in," [On-line], Poem dated 1920. Retrieved from Internet Jun. 3, 2013, URL:>http://en.wikipedia.org/wiki/E._E._Cummings<. (12 pages, see page 5).

http://www.target.com, Target Brands Inc., Archived on Jul. 14, 2009 retrieved from web.archive.org/web/20090714060557/http://www.target.com, pp. 1-84.

Kalbach, James, "Designing Web Navigation," O'Reilly Media, Aug. 2007, pp. 73-74 and 90.

Meloni, Julie C., "Sams Teach Yourself HTML and CSS in 24 Hours," 8$^{th}$ Ed., Sams Publishing, Dec. 2009, p. 361.

Office Action from Canadian Patent Application No. 145,725 mailed Oct. 1, 2012, 1 page.

(56) References Cited

OTHER PUBLICATIONS

Steve Eastman Presentation, Target Managers Meeting, Mar. 15, 2010, 11 pages.
TGT—Target Financial Community Meeting, Jan. 21, 2010, 7 pages.
Van Duyne et al., "The Design of Sites: Patterns for Creating Winning Web Sites," 2nd Ed., Prentice Hall, Dec. 14, 2006, pp. 677-758.
Amazon, Prime Eligible Under $25, [Online], Dec. 19, 2009, Retrieved from the Internet at: http://www.amazon.com/s/Znode=2238906011&field%2dprice=%2d2500&p%5f76=1, 4 pages.
Amazon, Recommended for You, [Online], Dec. 21, 2009, Retrieved from the Internet at https://www.amazon.com/gp/yourstore?ie=UTF8&ref_=pd%5Firl%5Fgw, 3 pages.
Amazon, Search Results for Columbia 100% Cotton Towels, Retrieved Aug. 10, 2011 from the Internet at: http://www.amazon.com/gp/search/ref=sr_nr_scat_10789941_1n?rh=n%3A10789941%2Ck%3Acotton+bath+towels&keywords=cotton+bath+towels&ie=UTF8&qid=1312572186&scn=10789941&h=5ec5aedf63cc88f6e48fda6b27c85681ae7a21ba, 6 pages.
Amazon.com Universal Wish List, [Online]. Dec. 20, 2010, Retrieved from the Internet at: http://www.amazon.com/b/?ie=UTF8&node=2223317011&tag=googhydr-20&hvadid=3877744091&ref=pd_sl_37ck7ovrfc_b, 3 pages.
"Bedding & Bath," http://www.kohls.com/kohlsStore/bedandbath/towels/decorativetowels.jsp?bmForm=guided_nav-search&SubcatFolderID=2534374752660882, at least as early as Mar. 29, 2011 (2 pages).
Best Buy, Every Day Laptops, [Online], Dec. 13, 2009, Retrieved from the Internet at: http://www.bestbuy.com/site/Laptop-Computers/Everyday-Laptops, 4 pages.
BestBuy, Search Results for "i7", Retrieved Aug. 5, 2011 from the Internet at: http://www.bestbuy.com/site/olspage.jsp;jsessionid=9B6687FFBB3C82, 8 pages.
Canon Digital Rebel XT Review (www.dcviews.com, Jul. 4, 2007, 5 pages).
Office Action from Canadian Patent Application No. 2,761,936, mailed Jul. 16, 2012 (3 pages).
Office Action from Canadian Patent Application No. 2,761,936, mailed Nov. 21, 2012 (3 pages).
Office Action from Canadian Patent Application No. 2,761,936, mailed Apr. 18, 2013 (3 pages).
Office Action from Canadian Patent Application No. 2,761,560, mailed Apr. 18, 2013 (3 pages).
Office Action from Canadian Patent Application No. 2,781,784, mailed Nov. 27, 2012 (4 pages).
Eddie Bauer.com, [Online], Dec. 20, 2010, Retrieved from the Internet at: https://www.eddiebauer.com/checkout/bag.jsp?&categoryId=95&categoryName=SWEATERS--CARDIGANS&pCategoryId=3&pCategoryName=WOMEN&gpCategoryId=1&gpCategoryName=EB#ppl=%7Btype%3A%22transition%22%2Censembleld%3A%2236211%22%2CformatStr%3A%22product%22%2CpassedIdObj%3A%7B%22ensembleld%22%3A%2236211%22%7D%2CcategoryId%3A%2227411%22%2CpathInfo%3A%22undefined%, 1 page.
Etihad Airways Home Page, Retrieved Aug. 10, 2011 from the Internet at: http://www.etihadairways.com/sites/etihad/us/en/home/pages/home.aspx?cid=ppc_start, 1 page.
Facebook Adds Profile Preview Feature [Online], Jan. 7, 2010, Retrieved from the Internet at: http://www.allfacebook.com/facebook-adds-profile-preview-feature-2008-09, 5 pages.
Google Product search results for "Canon Powershot", Retrieved Mar. 5, 2010 from the Internet at: http://www.google.com/products?q=canon+powershot&aq=0&oq=canon+p, 3 pages.
Grannell, Craig, .net/techniques, /CSS/create a navigation bar, Sep. 2, 2007, 4 pages.
HP Support, Search Results for "HP Pavilion dv7t-1000" / FAQ, Retrieved Mar. 25, 2010 from the Internet at: http://h10061.www1.hp.com/ccsearch/search?pname=HP+Pavilion+dv7t-1000+CTO+Ent, 1 page.
Han, Taedong, Exploring Price and Product Information Search Behavior in e-Market, Proceedings of the International Conference on Information Technology: Coding and Computer, Mar. 2005, 6 pages.
Just-Style: connecting to consumers, [Online], Sep. 16, 2002, Retrieved from the Internet at: http://www.just-style.com/articleprint.aspx?id=93012 on Dec. 19, 2009, 4 pages.
"Kitchen & Dining," http://www.amazon.com/kitchen-dining-small-appliances-cookware/b/?ie=UTF8&node=284507, at least as early as Jan. 28, 2011 (3 pages).
Kohls [Online], Dec. 20, 2010, Retrieved from the Internet at: http://www.kohls.com/upgrade/webstore/home.jsp;jsessionid=3cSgNPpTqV8tRh32vBzDf2q12xQJzpWQjD5Mpnrq1p3wtMX81Psn!-1748685949!105707934, 2 pages.
Kohls, Search Results for "bath towel", Retrieved Aug. 5, 2011 from the Internet at: http://www.kohls.com/upgrade/webstore/home.jsp;jsessionid=2W1QT8, 3 pages.
Lin, Wen-Shan et al., Understanding Consumer Search Activity and Online Purchase Intensions for Improving the Product Recommendation Search, 6th IEEE/ACIS International Conference on Computer and Information Science, Apr. 2007, 6 pages.
Logitech Mouse Home Page, Retrieved Aug. 10, 2011 from the Internet at: http://www.logitech.com/en-us/mice-pointers/mice, 13 pages.
Muspy, Artists [Online], Jan. 7, 2010, Retrieved from the Internet at: http://www.muspy.com/artists, 2 pages.
Online Pharmacy for Prescription Drugs—CVS Pharmacy Drug Store [Online], Dec. 21, 2009, Retrieved from the Internet at: http://www.cvs.com/CVSApp/user/home/home.jsp, 2 pages.
Organize.com, Kitchen, [Online], Dec. 20, 2009, Retrieved from the Internet at: http://www.organize.com/kitchen.html, 4 pages.
OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.
Pet, CSN Stores, [Online], Dec. 20, 2009, Retrieved from the Internet at http://www.csnstores.com/Pet-C216358.html, 2 pages.
"Priceless Promotions," by Samantha Murphy, Chain Store Age 84.10 (Oct. 2008): 58, 2 pages.
"Processors-Desktops," http://www.newegg.com/Store/SubCategory.aspx?SubCategory=343&name=Processors-Desktops, at least as early as Dec. 30, 2010 (1 page).
Sam's Club, [Online], Dec. 21, 2009, Retrieved from the Internet at: http://www.samsclub.com/shopping/index.jsp, 3 pages.
Sony Notebook Home Page, Retrieved Aug. 10, 2011 from the Internet at: http://store.sony.com/webapp/wcs/stores/servlet/CategoryDisplay?catalogId=10551&storeId=10151&langId=-1&categoryId=16154&SR=nav:electronics:computers:laptops:shop_compare:ss&ref=http%3A%2F%2Fwww.sony.com%2Findex.php, 5 pages.
Sonystyle, [Online], Dec. 13, 2009, Retrieved from the Internet at: http://www.sonystyle.com/webapp/wcs/stores/servlet/StoreCatalogDisplay?langId=-1&storeId=10151&catalogId=10551&eid=372683003, 2 pages.
Tom's Hardware Home Page, Tom's Hardware: Hardware News, Tests and Reviews, Retrieved Mar. 4, 2010 from the Internet at: http://www.tomshardware.com/us/#redirect, 3 pages.
Walmart, [Online], Dec. 21, 2009, Retrieved from the Internet at: http://www.walmart.com, 2 pages.
Yahoo! Small Business, Effective Navigation Bar Design, [Online], Dec. 21, 2009, Retrieved from the Internet at: http://smallbusiness.yahoo.com/r-pfp-a-40931-m-6-sc-37-effective_navigation_ar_design.html, 1 page.

\* cited by examiner

RETAIL INTERFACE

BACKGROUND

Retailing includes the sale of products such as goods, service, and merchandise. The products often are purchased from intermediary distributors and collected for presentation to users. Retail locations include department stores, boutiques, kiosks, malls, and mail order centers.

The Internet is a global system of interconnected computer networks. The Internet consists of private, public, academic, business, and government networks passing data back and forth. The Internet provides a communication pathway between computing devices.

Webpages are documents or resources of information that are often transferred via the Internet and displayed on web browsers. Many webpages are formatted in markup language documents such as hypertext markup language (HTML), which is a text based language for describing graphical documents. Web pages are rendered into a graphical user interface for presentation to a user.

Many retail systems utilize webpages to facilitate the sale of products. A collection of cohesively designed and implemented webpages are sometimes referred to a website. Some webpages contain dynamic elements for input and output to provide a rich experience to the user.

SUMMARY

In one example a retail webpage displays a product collage and social media content. For example, the social media content includes reviews by a user's social contacts and/or image of the user, the user's social contacts, and/or a product. Some content of the website, for example, is organized to display content in a predefined layout.

In another example a retail website system collects social information from external social networks. For example, a user's social information is identified and content created by the user's social contacts is identified. The created content is displayed, for example, with a product or group of products.

In another example, the layout of a webpage is organized to encourage a user to explore the webpage. The layout, for example, includes elements in two columns with content adjacent to similar content. For example, elements in descending location relate more or less specifically to a user.

The details of one or more implementations are set forth in the accompanying drawings and description below. Other features, objects, and advantages will be apparent from the description and drawings, and from the claims.

DESCRIPTION OF DRAWINGS

Like reference symbols in various drawings indicate like elements.

DETAILED DESCRIPTION OF ILLUSTRATIVE IMPLEMENTATIONS

Figure 1:
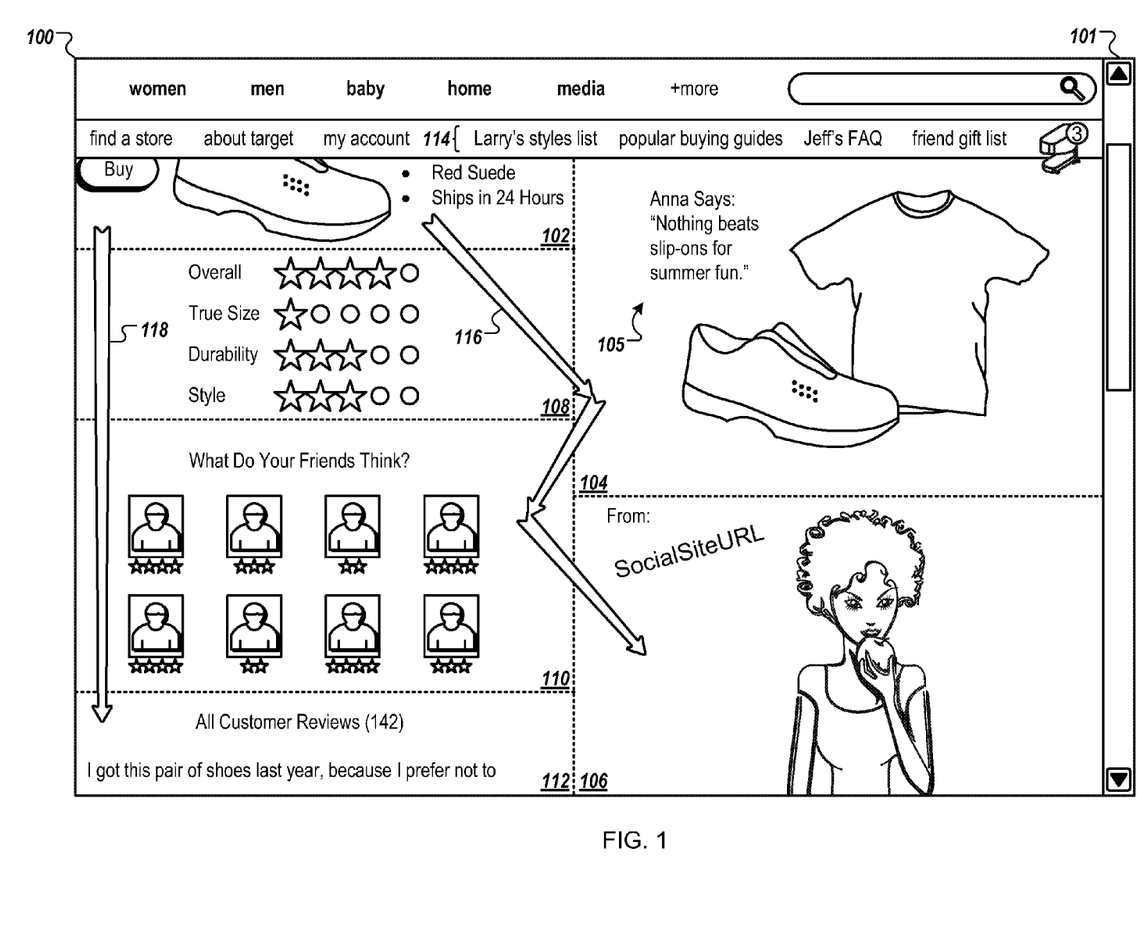
FIG. 1 shows an example retail webpage.

FIG. 1 shows an example retail webpage 100 of a retail website. The retail webpage includes graphic elements, for example, to encourage interest in lower portions of the webpage. The retail webpage 100 includes user generated content that is tailored to the viewer of the retail webpage 100.

A product display 102 contains an image and order elements for a product. An image of the product is displayed along with a list of features and a graphic button to place an order for the product. This section, placed at the top of the webpage, is one of the first elements displayed to a user when the page is loaded in some web browser. As currently shown, a scrollbar 101 is moved below the top of the page and only the lower portion of the product display 102 is shown.

A product collage display 104 contains a product collage and a third party designer commentary 105. The product collage shows images of two or more products sold via the retail website. In this example, the image of the shoe shown in the product collage is the same image as displayed in the product display 102, but it will be understood that other images are optionally used. In this example, the shoe shown in the product display 102 is the same shoe shown in the product collage display 104, but it will be understood a product collage optionally includes only other products. In one example, a collage of toothpaste and dental floss is shown on a product webpage for a toothbrush. The third party designer commentary 105 is a review or testimonial related to an element of the collage or the collage as a whole. In this example, the third party designer commentary 105 is from the designer that created the shoe in the collage, but is not otherwise affiliated with the retail webpage 100. In some examples, the third party designer commentary 105 is from a designer unassociated with the product collage display 104 or the products of the collage. In the retail webpage 100, the product collage display 104 is shown in a generally vertical column to the side of the product display 102 and partially below the product display 102. In this example, only a portion of the product collage display 104 is shown on some browsers when the retail webpage 100 is loaded and a user scrolls down to view the rest of the product collage display 104. In some examples, this encourages a user to explore more of the retail webpage 100, such as while considering the purchase of the product in the product display 102.

A social media image display 106 contains one or more social media images of people utilizing one or more elements of the product collage. The image is collected from a social media website, optionally one at which the viewer of the retail webpage 100 has an account. The social media image includes a website icon of the social media website and the icon includes a link to a webpage displaying the social media image. In some examples, the viewer of the retail webpage 100 has previously identified a list of social media websites at which the viewer has an account. The contacts at the social media website are collected and an image of a viewer's contact utilizing a product in the collage, or a similar product, is shown in the social media image display 106. In some examples, a familiar image or an image of a familiar person encourages a user to explore more of the retail webpage 100, such as while considering the purchase of the product in the product display 102.

A rating input display 108 contains interface elements to receive category reviews of the product in the product display 102, of the product collage display 104, or of elements of the product collage display 104. In this example, four categories are shown, the categories related to shoes or apparel. In some example retail webpages, different categories are used for other types of products. In some examples, the categories "Age Appropriate," "Durable," and "Replay Value" are used for a child's toy. In some examples, an interactive element that allows a user to express their opinions encourages a user to explore more of the retail webpage 100, such as while considering the purchase of the product in the product display 102.

A social media ratings display 110 shows ratings and/or reviews of users that are contacts of the viewer through the retail website, through an external social media website, or other system. In this example, an image of each of the contacts and their respective ratings in number of stars is shown. In some examples, the name of each contact or a contact screen name is shown. In some examples, text commentary is shown. In some examples, a familiar image, an image of a familiar person, or a rating from a familiar person encourages a user to explore more of the retail webpage 100, such as while considering the purchase of the product in the product display 102.

A ratings display 112 shows ratings and/or reviews from some or all users that have submitted ratings related to the content of the retail webpage 100. In this example, text based reviews are listed in a vertical column. In some examples, aggregate information such as average rating is shown in the ratings display 112. In some examples, information from a large number of customers encourages a user to explore more of the retail webpage 100, such as while considering the purchase of the product in the product display 102.

Retail elements 114 are shown in a heading element that is displayed at the top of the retail webpage 100, irrespective of the position of the scrollbar 101 or the general scroll position of the retail webpage 100. The retail elements 114 include links to a product registry, buying guide, frequently-asked-questions document, and product list. The retail elements 114 are identified or created by users that are contacts of the viewer through the retail website, through an external social media website, or other system. For example, if the user's sister makes a wishlist and is a contact with the user through the retail website, the user's sister's wishlist is accessible through the retail element 114 titled "friend gift list."

In some examples, the product display 102, the product collage display 104, the social media ratings display 110, and the social media image display 106 are displayed in descending order on the retail webpage 100 and on alternating sides in two generally vertical columns. For example, this placement encourages a user's attention to follow a path 116 through the retail webpage 100, such as while considering the purchase of the product in the product display 102.

In some examples, the product display 102, the rating input display 108, the social media ratings display 110, and the ratings display 112 are displayed in a generally vertical column. For example, a user reading down the column will be presented with display areas that go from more personal (their own opinions) to more universal (their contact's opinions, then stranger's opinions). In some examples, this layout encourages a user's attention to follow a path 118 through the retail webpage 100, such as while considering the purchase of the product in the product display 102.

Figure 2:
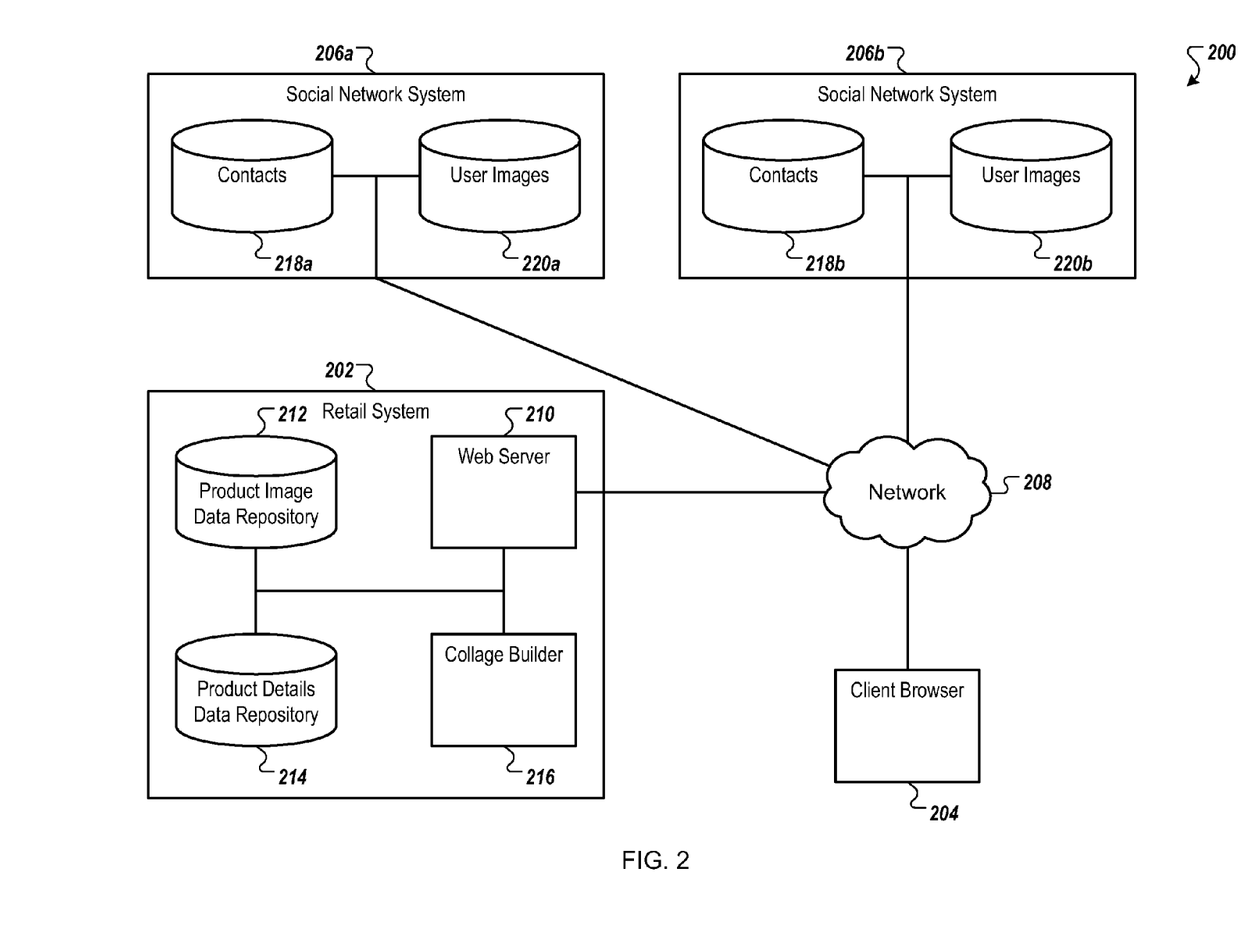
FIG. 2 shows an example system for serving retail webpages.

FIG. 2 shows an example system 200 for serving retail webpages. The system 200 is used, for example, to serve webpages that contain product collages and/or social media content. The system 200 includes a retail system 202 to generate webpages, a client browser 204 to display webpages, and social network systems 206 to store user data.

The retail system 202 includes a web server 210. The web server 210 serves content such as webpages, documents, and files. The web server 210 delivers data through various protocols including hypertext transfer protocol (HTTP) and file transfer protocol (FTP). A product image data repository 212 stores images of products sold through the retail system 202. A product details data repository 214 stores details about a product such as price, name, category, and options. A collage builder 216 generates collages that include images of products. The images are selected by receiving product indications from the client browser 204 and retrieving the images from a product image data repository 212. The web server 210 uses data from the product image data repository 212, the product details data repository 214, and the collage builder 216 to generate and/or serve product webpages.

The client browser 204 is a web browser for retrieving, presenting, and traversing information resources, including those served by the retail system 202. The web server receives webpages, documents, and files which are rendered and/or displayed for a user.

The social network systems 206a and 206b receive, organize, store, and serve social data about users. The social network systems, in this example, include contacts 218a, 218b and user images 220a, 220b. The user images 220a, 220b include images submitted by users and optionally tagged with the people and items in the image. In some examples, one or both of the social network systems 206a, 206b is owned, operated, or otherwise under the control of the retail system 202. In some examples, the retail system 202 organizes and indexes users by their social relationships (e.g., user identified friends, users with similar shopping or browsing habits, users in similar geographic locations, etc). In some examples, the retail system 202 matches user data with the contacts 218a, 218b supplied by the social network systems 206a, 206b operated by different business entities.

A network 208 is a system that passes data and/or communications between systems. The network 208 optionally includes the Internet, local area networks, wireless networks, and cellular data networks.

Figure 3:
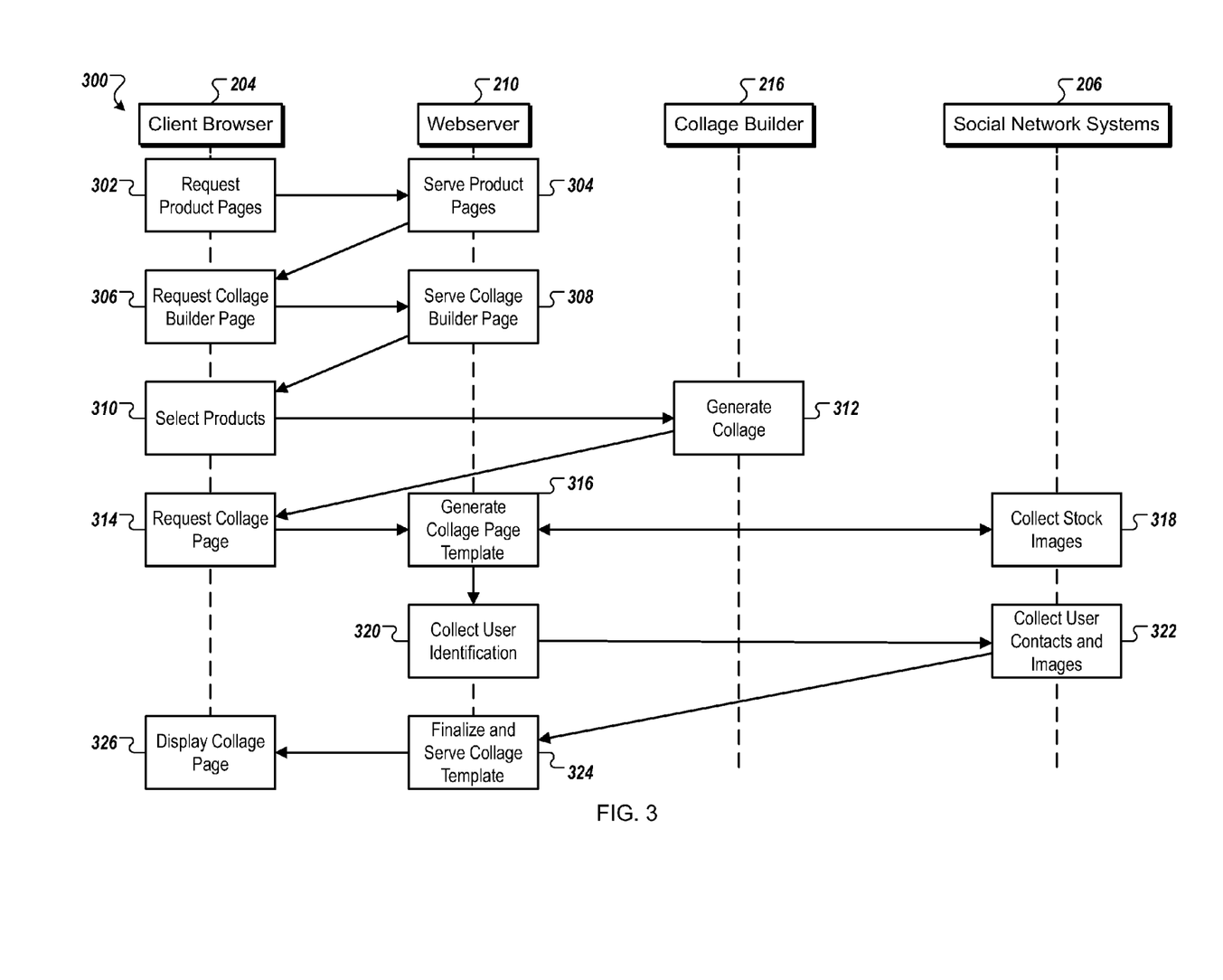
FIG. 3 is a swimlane diagram of an example method of serving retail webpages.

FIG. 3 is a swimlane diagram of an example method 300 of serving retail webpages. The method 300 is used, for example, to serve a webpage which includes graphic elements, for example, to encourage interest in lower portions of the webpage. The served webpage includes user generated content that is tailored to the viewer of the retail webpage.

The client browser 204 requests a series of product pages (302), for example, in response to input from a user interested in browsing multiple products for sale through a retail website. The web server 210 serves the requested product pages (304). The client browser 204 requests a collage builder page (306), for example, in response to input from a user that has seen two products to be used or presented together. The web server 210 serves the collage builder page (308) to the client. In some examples, the collage builder page includes a listing of items (e.g., recently viewed items, items in a user's shopping carts, items from a particular designer or manufacturer, etc.), and a layout manager that accepts user input to specify the layout of images in a collage. The client browser 204 selects two or more products (310) and sends the selections to the collage builder 216. The collage builder 216 generates a collage (312). The collage includes elements such as a collection of products, a collection of images, an image that includes images of products, and other data. In some examples, a collage is stored as a reference to data used in non-collage webpages. In some implementations, a collage is stored by making copies of data, such as images, product description, and other data (e.g., as referenced from a product information repository), and storing this various collage-related data in a separate location (e.g., in a collage information repository).

The client browser 204 requests a collage page (314). In some examples, the collage page is a product profile page that includes a product collage, a product display, a product collage display, a social media rating display, and the social media image display. In some examples, the collage page is a product profile page that includes a product display, a rating input display, a social media ratings display, and a ratings display. The web server 210 generates a collage page template (316). The collage page template includes general information, such as information not associated with a particular user or a particular user's social contacts, history, or browsing behavior. In some examples, the collage page template includes default data that is replaced with user specific data. In some examples, the collage page template does not include elements that are added only if user specific data is included in the collage page, such as images from a social media system which are optionally displayed if the user's contacts are identified. The social network systems 206 collect stock images (318), such for use in the collage page template.

The web server 210 collects the identification of the user (320) that is associated with the collage page request. The user identification is cross referenced with a list of users of the social network systems 206. The social network systems 206 collect the contacts and images related to the user (322). For example, a list of the user's contacts and a reference to images tagged with the user and their contacts is compiled and transmitted to the web server 210.

The web server 210 receives the information from the social network systems 206 and finalizes the collage template for serving (324). In some examples, comments made by the user's contacts are removed from a listing of all comments and added to a display that shows comments by the user's contacts. In some examples, social media images containing the user, the user's contacts, and/or one of the products in the product collage are added to the collage webpage. The web server 210 serves the collage webpage to the client browser 204 and the client browser displays the collage page (326).

Although a particular number, order, and type of operations are shown here, it will be appreciated that other numbers, orders, and types of operations are possible. For example, the client browser 204 requests a collage builder page (306), the request including the identification of two or more products (310). In another example, the operation 318 (collect stock images at the social network systems 206) is not undertaken, such as if social media images are not included in a collage webpage served to a user with no social network contacts.

Figure 4:
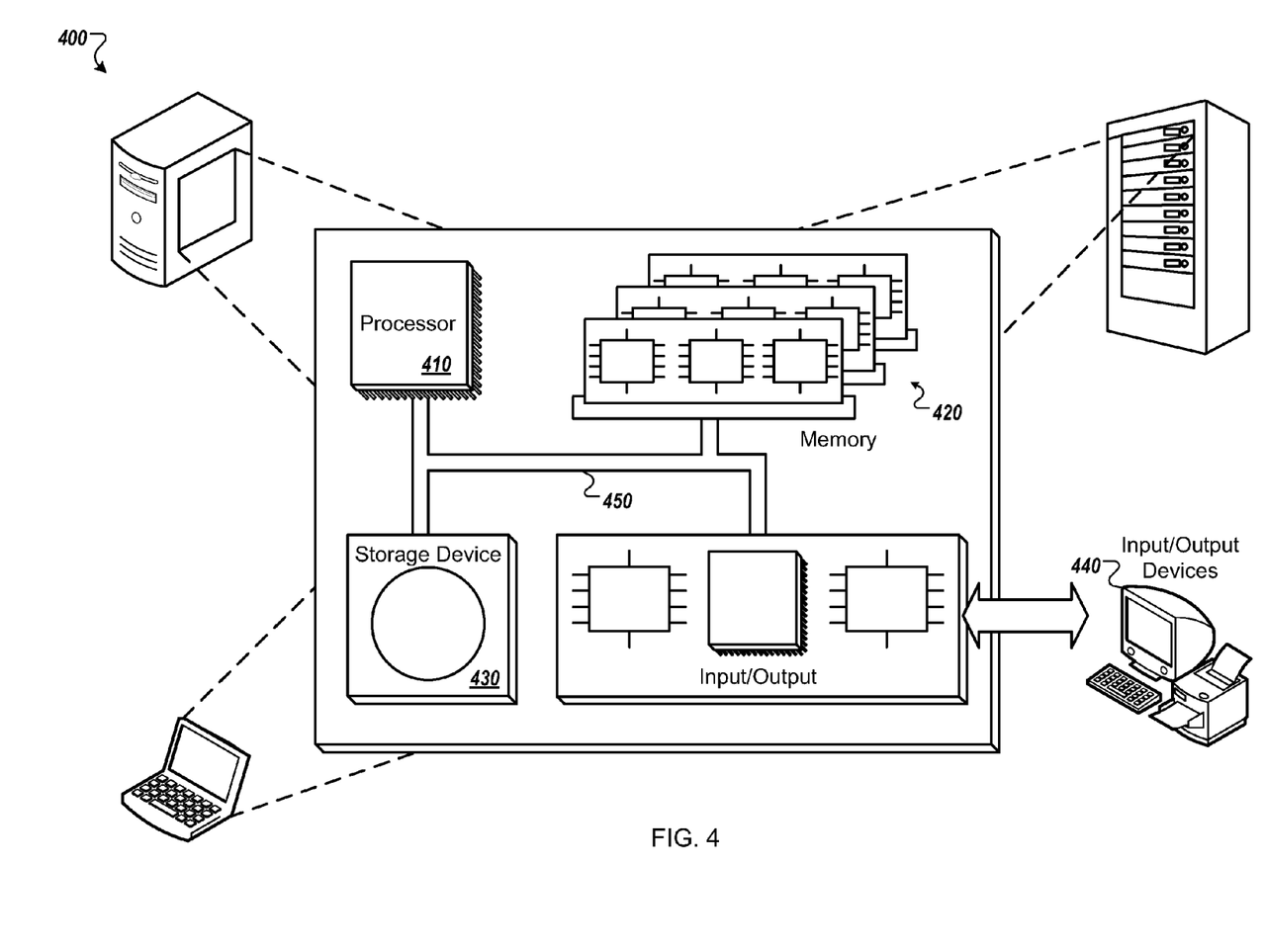
FIG. 4 is a block diagram of a computing system optionally used in connection with computer-implemented methods described in this document.

FIG. 4 is a schematic diagram of a generic computer system 400. The system 400 is optionally used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 is optionally a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

In some examples, the features described are implemented in digital electronic circuitry or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features, in some instances, are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A computer-implemented method of serving a webpage on at least one display over a communication network, the webpage being served by operating one or more computers to generate webpage content, the method comprising:
    generating, with the one or more computers, a first product display including details of a first product and generating a second product display including details of a second product;
    creating, with the one or more computers, a product collage including a first image of the first product and a second image of the second product;
    receiving contacts of a user from a social networking system; and
    serving, with the one or more computers over the communication network, the webpage to the user, the webpage including the product collage and a social media image from the social networking system, the social media image showing a person utilizing at least one of the first product and the second product.

2. The method of claim 1, wherein the webpage includes a third party commentary, the third party commentary being retrieved from a third party, the third party commentary being associated with one of the product collage and an element of the product collage.

3. The method of claim 1, wherein the webpage includes a product commentary from one of the contacts.

4. The method of claim 1, wherein the webpage includes a retail element identified by one or more of the contacts.

5. The method of claim 4, wherein the retail element is one of a product registry, a buying guide, a frequently-asked-questions document, and a product list.

6. The method of claim 1, wherein the webpage includes a user input control configurable to receive category reviews for one of the first product and the second product.

7. The method of claim 1, further comprising arranging the product collage and the social media image along with other webpage content such that the webpage layout from top to bottom goes from personal to universal.

8. A computer-implemented method of serving a webpage on at least one display over a communication network, the webpage being served by operating one or more computers to generate webpage content, the method comprising:
    generating, with the one or more computers, a sales presentation area to display a first item, the first item being available for sale;
    generating, with the one or more computers, a compilation presentation area to display an item compilation, the item compilation comprising a first image of the first item and a second image of a second item, the first item and the second item being identified through a compilation creating graphic user interface; and
    generating, with the one or more computers, a social media image presentation area to display a social media image from a social media site, the social media image showing a person utilizing at least one of the first item or the second item,
    wherein the webpage is organized into a left column and a right column, the left column displaying the sales presentation area, and the right column displaying the compilation presentation area and the social media image presentation area, and
    wherein the compilation presentation area and the social media image presentation area are displayed at least partly below the sale presentation area.

9. The method of claim 8, wherein the webpage includes a social review presentation area to display an item review from a social media contact.

10. The method of claim 9, wherein the social review presentation area is displayed in the left column below the sales presentation area and at least partly horizontally in line with the compilation presentation area and the social media image presentation area.

11. The method of claim 8, wherein the webpage includes a review control presentation area configurable to receive multicomponent reviews for at least one of the first and the second item.

12. The method of claim 11, wherein the left column displays the review control presentation area, the review control presentation area being below the sales presentation area.

13. The method of claim 8, wherein the webpage further includes a review received from a third party, the review associated with at least one of the first item or the second item.

14. The method of claim 8, wherein the webpage further includes a link to a document identified by a social media contact.

15. The method of claim 14, wherein the link to a document is a link to one of an item registry, a buying guide, a frequently-asked-questions document, and an item list.

16. A computer-implemented method of serving a webpage on at least one display over a communication network, the webpage being served by operating one or more computers to generate webpage content, the method comprising:
    creating, with the one or more computers, a first inventory item profile including details of a first inventory item and creating a second inventory item profile including details of a second inventory item;
    creating, with the one or more computers, a composite image including a first image of the first inventory item and a second image of the second inventory item;
    receiving, with the one or more computers via the communication network, one or more contacts of a user from a social networking system; and
    creating, with the one or more computers, a composite image document including the composite image and a social media image from a third party social networking site, the social media image showing a person utilizing at least one of the first inventory item or the second inventory item.

17. The method of claim 16, wherein the composite image document includes a commentary received from a third party, the commentary being associated with at least one of the first inventory item or the second inventory item.

18. The method of claim 16, wherein the composite image document includes an inventory item commentary from one of the contacts.

19. The method of claim 16, wherein the composite image document includes a retail element identified by one or more of the contacts.

20. The method of claim 19, wherein the retail element is one of an inventory item registry, a buying guide, frequently-asked-questions document, and an inventory item list; and wherein the composite image document is an inventory item profile document.

\* \* \* \* \*